United States Patent
Geiger et al.

(10) Patent No.: US 7,551,761 B2
(45) Date of Patent: Jun. 23, 2009

(54) METHOD AND APPARATUS FOR FAST AUTOMATIC CENTERLINE EXTRACTION FOR VIRTUAL ENDOSCOPY

(75) Inventors: Bernhard Geiger, Cranbury, NJ (US); Jean-Daniel Boissonnat, Mouans-Sartoux (FR)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 12/254,945

(22) Filed: Oct. 21, 2008

(65) Prior Publication Data

US 2009/0041321 A1 Feb. 12, 2009

Related U.S. Application Data

(62) Division of application No. 10/842,972, filed on May 11, 2004, now Pat. No. 7,457,444.

(60) Provisional application No. 60/470,579, filed on May 14, 2003.

(51) Int. Cl.
*G06K 9/00* (2006.01)
*G06T 11/20* (2006.01)
*G06T 15/00* (2006.01)
*G06T 17/00* (2006.01)

(52) U.S. Cl. .......... 382/128; 382/131; 382/154; 382/180; 345/419; 345/420; 345/424; 345/441

(58) Field of Classification Search .......... 382/128, 382/130, 154, 180; 345/418–420, 424, 441
See application file for complete search history.

(56) References Cited

U.S. PATENT DOCUMENTS

| | | | | |
|---|---|---|---|---|
| 4,858,149 A | * | 8/1989 | Quarendon | 345/419 |
| 5,971,767 A | * | 10/1999 | Kaufman et al. | 434/267 |
| 6,711,231 B2 | * | 3/2004 | Knoplioch et al. | 378/8 |
| 6,968,299 B1 | * | 11/2005 | Bernardini et al. | 703/2 |
| 7,081,088 B2 | * | 7/2006 | Geiger | 600/103 |
| 7,085,689 B2 | * | 8/2006 | Davis et al. | 703/2 |
| 2001/0031920 A1 | * | 10/2001 | Kaufman et al. | 600/431 |
| 2004/0109603 A1 | * | 6/2004 | Bitter et al. | 382/154 |
| 2004/0209234 A1 | * | 10/2004 | Geiger | 434/262 |
| 2005/0033114 A1 | * | 2/2005 | Geiger et al. | 600/101 |
| 2005/0240094 A1 | * | 10/2005 | Pichon et al. | 600/407 |
| 2006/0270928 A1 | * | 11/2006 | Geiger et al. | 600/407 |
| 2007/0024617 A1 | * | 2/2007 | Poole | 345/424 |
| 2007/0052724 A1 | * | 3/2007 | Graham et al. | 345/620 |

OTHER PUBLICATIONS

Wan, Ming et al., "Automatic Centerline Extraction for Virtual Colonoscopy", IEEE Transactions on Medical Imaging, vol. 21, No. Dec. 12, 2002.*

(Continued)

*Primary Examiner*—Samir A. Ahmed
*Assistant Examiner*—Gandhi Thirugnanam
(74) *Attorney, Agent, or Firm*—Donald B. Paschburg

(57) ABSTRACT

A method for automatic centerline extraction for a virtual endoscopy image of an organ having a boundary surface includes centering on selected points of an initial path through the image, which is derived from an endoscopy dataset, respective spheres exhibiting respective maximal diameters short of contacting the boundary surface; and forming a centered path consecutively joining centers of the spheres.

9 Claims, 2 Drawing Sheets a  b  c

OTHER PUBLICATIONS

Kirbas, C. and Quek, Francis, "A Review of Vessel Extraction Techniques and Algorithms", ACM Computing Surveys (CSUR) vol. 36 Issue 2 (Jun. 2004).*

Maddah et al. "Efficient center-line extraction for quantification of vessels in confocal microscopy images", Med. Phys vol. 30 Issue 2 (Feb. 2003).*

* cited by examiner

METHOD AND APPARATUS FOR FAST AUTOMATIC CENTERLINE EXTRACTION FOR VIRTUAL ENDOSCOPY

CROSS-REFERENCE TO RELATED APPLICATIONS PRIORITY

Specific reference is hereby made to U.S. application Ser. No. 10/842,972 filed May 11, 2004 now U.S. Pat. No. 7,457,444 which this application is a divisional of and U.S. Provisional Application No. 60/470579, entitled FAST AUTOMATIC CENTERLINE EXTRACTION, filed May 14, 2003 in the name of Bernhard Geiger et al., the inventors in the present application and of which the benefit of priority is claimed and whereof the disclosure is hereby incorporated herein by reference.

Reference is also made to copending U.S. patent application Ser. No. 10/753,703, entitled METHOD AND APPARATUS FOR AUTOMATIC LOCAL PATH PLANNING FOR VIRTUAL COLONOSCOPY, filed Jan. 8, 2004 in the name of Bernhard Geiger, an inventor in the present application and whereof the disclosure is hereby incorporated herein by reference to the extent it is not incompatible with the present invention.

The present application relates generally to computer vision and imaging systems, virtual endoscopy and, more particularly, to a system and method for fast, automatic centerline extraction such as may be utilized for virtual endoscopy, including virtual colonoscopy.

BACKGROUND OF THE INVENTION

Virtual colonoscopy (VC) refers to a method of diagnosis based on computer simulation of standard, minimally invasive endoscopic procedures using patient specific three-dimensional (3D) anatomic data sets. Examples of current endoscopic procedures include bronchoscopy, sinusoscopy, upper gastro-intestinal endoscopy, colonoscopy, cystoscopy, cardioscopy, and urethroscopy. VC visualization of non-invasively obtained patient specific anatomic structures avoids risks, such as perforation, infection, hemorrhage, and so forth, associated with real endoscopy, and provides the endoscopist with important information prior to performing an actual endoscopic examination. Such information and understanding can minimize procedural difficulties, decrease patient morbidity, enhance training and foster a better understanding of therapeutic results.

In virtual endoscopy, 3D images are created from two-dimensional (2D) computerized tomography (CT) or magnetic resonance (MR) data, for example, by volume rendering. Present-day CT and MRI scanners typically produce a set of cross-sectional images which, in combination, produce a set of volume data. These 3D images are created to simulate images coming from an actual endoscope, such as a fiber optic endoscope.

It is desirable in virtual endoscopy, and especially in virtual colonoscopy, to determine a centerline as guide to the examination procedure. Prior techniques for calculating such a centerline typically utilize concepts of morphological operators, distance transform, minimum cost path, Dijkstra's algorithm, and so forth. References to such prior techniques can be found, for example, in Zhou et al., "Three-Dimensional Skeleton and Centerline Generation Based on an Approximate Minimum Distance Field," The Visual Computer, 14:303-314 (1998); Truyen, T. Deschamps, L. D. Cohen. Clinical evaluation of an automatic path tracker for virtual colonoscopy. Medical Image Computing and Computer-Assisted Intervention (MICCAI), Utrecht, Netherlands, October 2001; Chen et al., "A Fast Algorithm to Generate Centerline for Virtual Colonscopy", SPIE Conference, Feb. 12-18, 2000. Richard Robb, "Virtual (Computed) Endoscopy: Development and Evaluation Using the Visible Human Datasets", Oct. 7-8, 1996. www.mayo.edu.; and in U.S. Pat. No. 6,514,082 entitled "System and method for performing a three-dimensional examination with collapse correction," issued in the name of Kaufman et al., Feb. 4, 2003.

BRIEF SUMMARY OF THE INVENTION

It is herein recognized that prior techniques for centerline calculation such as the afore-mentioned techniques that utilize concepts of morphological operators, distance transform, minimum cost path, Dijkstra's algorithm, and so forth, are relatively slow.

In accordance with an aspect of the present invention, a method for centerline calculation exhibits characteristics that are especially useful for colon data.

In accordance with a principle of the invention, it is herein recognized that a centerline in a 3D environment can be interpreted as the location of spheres with maximal diameters constrained by boundary conditions.

In accordance with an aspect of the invention, a method for automatic centerline extraction for a virtual endoscopy image of an organ having a boundary surface, comprises centering on selected points of an initial path through the image, derived from an endoscopy dataset, respective spheres exhibiting respective maximal diameters short of contacting the boundary surface; and forming a centered path consecutively joining centers of the spheres.

In accordance with another aspect of the invention, the step of forming a centered path comprises smoothing the centered path to form a modified centered path.

In accordance with another aspect of the invention, the step of forming a centered path comprises centering on selected points of the modified centered path respective spheres exhibiting respective maximal diameters short of contacting the boundary surface; and forming a further modified centered path consecutively joining centers of the spheres.

In accordance with another aspect of the invention, the step of forming a centered path comprises repetitively performing the steps of centering and forming for deriving a final centered path that has been modified to a desired degree.

In accordance with another aspect of the invention, the step of centering the respective spheres comprises:

(a) utilizing spheres modeled by respective polyhedra;
(b) centering a modeled first sphere that is relatively small compared with space available within the boundary surface;
(c) checking for collision between vertices of the modeled first sphere and the boundary surface;
(d) in the event of a collision being detected at a point of the boundary, deriving a calculated force to move the modeled sphere away from the point of the boundary surface for ending the collision;
(e) in the event of at least one of (A) no collision and (B) a collision having been ended, the modeled first sphere is enlarged until a collision is detected, whereupon steps (d) and (e) are repeated until no further enlargement of movement of the modeled first sphere is possible without a collision being detected, whereupon:
(f) steps (b) through (e) are repeated for each remaining one of the spheres and a centered path is formed by consecutively joining centers of the spheres.

In accordance with another aspect of the invention, step (d) comprises the force causing the modeled sphere to move on a plane perpendicular to the initial path.

In accordance with another aspect of the invention, the step of deriving a calculated force comprises achieving an interactive speed by utilizing spatial and temporal coherence.

In accordance with another aspect of the invention, the step of centering the respective spheres comprises:
(A) utilizing modeled spheres represented by respective polyhedra;
(B) centering a modeled first sphere;
(C) checking for collision between vertices of the modeled first sphere and the boundary surface;
(D) in the event of a collision being detected at a point of the boundary, deriving a calculated force to move the modeled sphere away from the point of the boundary surface for ending the collision;
(E) in the event of at least one of (A) no collision and (B) a collision having been ended, the modeled first sphere is enlarged until a collision is detected, whereupon step (D) IS repeated until no further enlargement and no further movement of the modeled first sphere is possible without a collision being detected, proceeding to step (F); and
(F)) repeating steps (b) through (f) are repeated for each remaining one of the modeled spheres and a centered path is formed by consecutively joining centers of the modeled spheres.

In accordance with another aspect of the invention, step (D) comprises the force causing the modeled sphere to move on a plane perpendicular to the initial path.

In accordance with another aspect of the invention, the step of deriving a calculated force comprises achieving an interactive speed by utilizing spatial and temporal coherence.

In accordance with another aspect of the invention, a method for automatic centerline extraction for a virtual endoscopy image of an organ having a boundary surface, comprises: deriving an initial path through the image between initial and final voxels of an endoscopy dataset; centering on selected points of the initial path respective spheres exhibiting respective maximal diameters short of contacting the boundary surface; and forming a centered path consecutively joining centers of the spheres.

In accordance with another aspect of the invention, a method for automatic centerline extraction for a virtual endoscopy image of an organ having a boundary surface, comprises: deriving a colonoscopy voxel dataset by using a colonoscopy protocol; deriving an initial path through the image between initial and final voxels of an endoscopy dataset; centering on selected points of the initial path respective spheres exhibiting respective maximal diameters short of contacting the boundary surface; and forming a centered path consecutively joining centers of the spheres.

In accordance with another aspect of the invention, a method for automatic centerline extraction for a virtual endoscopy image of an organ having a boundary surface, comprises: deriving an endoscopy voxel dataset by using an endoscopy protocol; deriving an initial path through the image between initial and final voxels of the dataset, the initial path exhibiting vertices; centering on consecutive ones of the vertices respective spheres exhibiting respective maximal diameters short of contacting the walls; and forming a centered path consecutively joining centers of the spheres.

In accordance with another aspect of the invention, a method for automatic centerline extraction for a virtual endoscopy image of an organ having a boundary wall, comprises: deriving an endoscopy voxel dataset by using an endoscopy protocol; starting with an initial voxel in the dataset, labeling voxels neighboring the initial voxel with a first label number of a series of consecutively increasing label numbers; labeling voxels neighboring respective ones of the voxels having the first label number with a second label number of the series; repeating the foregoing step by labeling with progressively higher label numbers those voxels neighboring voxels numbered in the foregoing step, until an endpoint is reached with voxels having a highest label number; starting at a first voxel with the highest label number, searching for a neighboring second voxel with a smaller label number than the first voxel and storing the location thereof; starting at the second voxel, searching for a neighboring third voxel with a smaller label number than the second voxel and storing the location thereof; repeating the foregoing step until the initial voxel is reached, thereby establishing an initial path through the image between the initial and the first voxel; smoothing the initial path so as to result in an intermediate path, the intermediate path exhibiting a plurality of vertices; centering on a first vertex a sphere exhibiting a maximal diameter short of contacting the walls; centering on further vertices of the plurality respective spheres exhibiting respective maximal diameters short of contacting the boundary wall; and forming a centered path consecutively joining centers of the spheres.

In accordance with another aspect of the invention, the step of forming a centered path consecutively joining centers of the spheres comprises: smoothing the centered path; centering on a selected first point of the centered path a sphere exhibiting a maximal diameter short of contacting the walls; centering on selected further points of the centered path respective spheres exhibiting respective maximal diameters short of contacting the boundary wall; and forming a modified centered path consecutively joining centers of the spheres.

In accordance with another aspect of the invention, the first point and the further points comprise vertices of the centered path.

In accordance with another aspect of the invention, the step of forming a centered path consecutively joining centers of the spheres comprises: smoothing the centered path; centering on a selected first point of the centered path a sphere exhibiting a maximal diameter short of contacting the walls; centering on selected further points of the centered path respective spheres exhibiting respective maximal diameters short of contacting the boundary wall; forming a modified centered path consecutively joining centers of the spheres; and selectively repeating the above-listed steps until the centered path has been yet further modified to a desired degree of smoothing.

In accordance with another aspect of the invention, the first point and the further points comprise vertices of the centered path.

In accordance with another aspect of the invention, a method for automatic centerline extraction for a virtual endoscopy image of an organ having a boundary, comprises:
deriving an endoscopy voxel dataset by using an endoscopy protocol; starting with an initial voxel in the dataset, labeling first neighboring voxels of the initial voxel with a first label number of a progressive series; labeling next neighboring voxels of the first neighboring voxels a second label number of the series; repeating the foregoing step until an endpoint is reached with voxels having a final label number of the series; starting at a first voxel with the final label number, searching for a neighboring second voxel with an prior label number than the first voxel and storing the location thereof; starting at the second voxel, searching for a neighboring third voxel with an prior label number than the second voxel and storing the location thereof; repeating the foregoing step until the initial voxel is reached, thereby establishing an initial path through the image between the initial and the first voxel; smoothing the initial path so as to result in an intermediate path; centering on selected points of the intermediate paths respective spheres exhibiting respective maximal diameters short of contacting the boundary; and forming a centered path consecutively joining centers of the spheres.

In accordance with another aspect of the invention, a method for automatic centerline extraction for a virtual colonoscopy image of a colon having a boundary wall, comprising: deriving a colonoscopy voxel dataset by using a colonoscopy protocol: starting with an initial voxel in the dataset, labeling voxels neighboring the initial voxel with a first label number of a series of consecutively increasing label numbers; labeling voxels neighboring respective ones of the voxels having the first label number with a second label number of the series; repeating the foregoing step by labeling with progressively higher label numbers those voxels neighboring voxels numbered in the foregoing step, until an endpoint is reached with voxels having a highest label number; starting at a first voxel with the highest label number, searching for a neighboring second voxel with a smaller label number than the first voxel and storing the location thereof; starting at the second voxel, searching for a neighboring third voxel with a smaller label number than the second voxel and storing the location thereof; repeating the foregoing step until the initial voxel is reached, thereby establishing an initial path through the image between the initial and the first voxel; smoothing the initial path so as to result in an intermediate path, the intermediate path exhibiting plurality of vertices; centering on a first vertex a sphere exhibiting a maximal diameter short of contacting the walls; centering on further vertices of the plurality respective spheres exhibiting respective maximal diameters short of contacting the boundary wall; and forming a centered path consecutively joining centers of the spheres.

In accordance with another aspect of the invention, a method for automatic centerline extraction for a virtual colonoscopy image of a colon having a boundary surface, comprises: deriving a colonoscopy voxel dataset by using a colonoscopy protocol; deriving an initial path through the image between initial and final voxels of the dataset; centering on selected points of the initial path respective spheres exhibiting respective maximal diameters short of contacting the boundary surface; and forming a centered path consecutively joining centers of the spheres.

In accordance with another aspect of the invention, apparatus for automatic centerline extraction for a virtual colonoscopy image of a colon having a boundary surface, comprises: apparatus for deriving a colonoscopy voxel dataset by using a colonoscopy protocol; apparatus for deriving an initial path through the image between initial and final voxels from a colonoscopy dataset; apparatus for centering on selected points of the initial path respective spheres exhibiting respective maximal diameters short of contacting the boundary surface; and apparatus for forming a centered path consecutively joining centers of the spheres.

In accordance with another aspect of the invention, a method for automatic centerline extraction for a virtual endoscopy image of an organ having a boundary surface includes centering on selected points of an initial path through the image, which is derived from an endoscopy dataset, respective spheres exhibiting respective maximal diameters short of contacting the boundary surface; and forming a centered path consecutively joining centers of the spheres.

In accordance with another aspect of the invention, a method for automatic centerline extraction for data set representing an object having a boundary surface, comprises centering on selected points of an initial path through the object, derived from the dataset, respective spheres exhibiting respective maximal diameters short of contacting the boundary surface; and forming a centered path consecutively joining centers of the spheres.

In accordance with another aspect of the invention the step of forming a centered path comprises smoothing the centered path to form a modified centered path.

In accordance with another aspect of the invention the step of forming a centered path comprises centering on selected points of the modified centered path respective spheres exhibiting respective maximal diameters short of contacting the boundary surface; and forming a further modified centered path consecutively joining centers of the spheres.

In accordance with another aspect of the invention the step of forming a centered path comprises repetitively performing the steps of centering and forming for deriving a final centered path that has been modified to a desired degree.

In accordance with another aspect of the invention, the step of centering the respective spheres comprises (a) utilizing spheres modeled by respective polyhedra; (b) centering a modeled first sphere that is relatively small compared with space available within the boundary surface; (c) checking for collision between vertices of the modeled first sphere and the boundary surface; (d) in the event of a collision being detected at a point of the boundary, deriving a calculated force to move the modeled sphere away from the point of the boundary surface for ending the collision; (e) in the event of at least one of (A) no collision and (B) a collision having been ended, the modeled first sphere is enlarged until a collision is detected, whereupon steps (d) and (e) are repeated until no further enlargement of movement of the modeled first sphere is possible without a collision being detected, whereupon: (f) steps (b) through (e) are repeated for each remaining one of the spheres and a centered path is formed by consecutively joining centers of the spheres.

In accordance with another aspect of the invention, step (d) comprises the force causing the modeled sphere to move on a plane perpendicular to the initial path.

In accordance with another aspect of the invention the step of deriving a calculated force comprises achieving an interactive speed by utilizing spatial and temporal coherence.

In accordance with another aspect of the invention, the step of centering the respective spheres comprises: (A) utilizing modeled spheres represented by respective polyhedra; (B) centering a modeled first sphere; (C) checking for collision between vertices of the modeled first sphere and the boundary surface; (D) in the event of a collision being detected at a point of the boundary, deriving a calculated force to move the modeled sphere away from the point of the boundary surface for ending the collision; (E) in the event of at least one of (A) no collision and (B) a collision having been ended, the modeled first sphere is enlarged until a collision is detected, whereupon step (D) is repeated until no further enlargement and no further movement of the modeled first sphere is possible without a collision being detected, proceeding to step (F); and (F) repeating steps (B) through (E) for each remaining one of the modeled spheres and a centered path is formed by consecutively joining centers of the modeled spheres.

In accordance with another aspect of the invention, step (D) comprises the force causing the modeled sphere to move on a plane perpendicular to the initial path.

In accordance with another aspect of the invention, the step of deriving a calculated force comprises achieving an interactive speed by utilizing spatial and temporal coherence.

BRIEF DESCRIPTION OF THE DRAWINGS

The invention will be more fully understood from the detailed description which follows, in conjunction with the drawings in which.

DETAILED DESCRIPTION OF THE INVENTION

Figure 1:
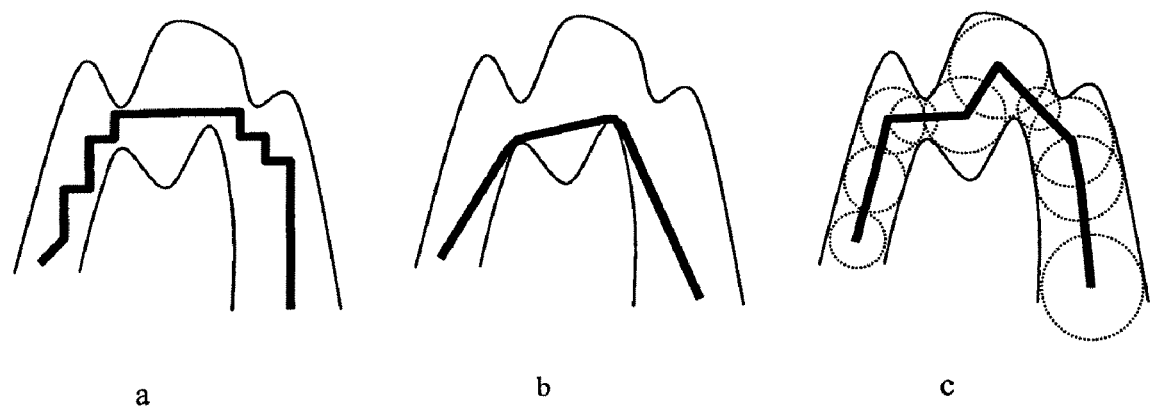
FIGS. 1 and 2 show an initial voxel path, an initial smoothing step, and final centering in accordance with an embodiment of the invention.

It will be understood that the method and system of the present invention are preferably implemented utilizing a programmable digital computer and that the operations herein described are in reference to such an implementation. In the context of imaging, terms such as "air", "lumen", etc. are typically intended to refer to the corresponding imaging of these features.

In accordance with an embodiment of the present invention, colon segmentation comprises performing a start- and endpoint calculation, and performing an initial path calculation as will be described hereinafter. This is followed by path centering and smoothing.

Generally, the method in accordance with the invention starts with a colon dataset that has been obtained using a colonoscopy protocol typically including bowel preparation and air insufflation. The dataset is segmented by applying a threshold to air and doing connected component analysis, whereby connected components that do not belong to the colon are discarded, either automatically or by manual selection.

It is noted, nevertheless, that the method of the invention is applicable to other virtual endoscopic examinations and, indeed generally to a cavity having boundary surfaces. Furthermore, the method of the invention is applicable to other datasets which are not necessarily prepared for virtual endoscopy, such as, by way of example, blood vessels with contrast. The centerline method has other possible uses, including registration or mapping two centerlines onto each other, making measurements, defining orthogonal cross sections along a vessel, segmentation, and visualization.

An embodiment of the present method comprises:
A. Colon Segmentation;
B. Start- and Endpoint calculation;
C. Initial Path calculation; and
D. Path centering and smoothing.

In step A, Colon Segmentation starts with a colon dataset that has been obtained using a colonoscopy protocol, e.g. bowel preparation, air insufflation, and so forth. The dataset is segmented by applying a threshold to air, and doing connected component analysis. Connected components that do not belong to the colon are discarded, either automatically or by manual selection.

In step B, Start- and Endpoint calculation, a distance labeling is performed, starting from a first voxel that belongs to the colon. This first voxel is labeled $0$, its neighbors are labeled $1$, their neighbors are labeled $2$, and so forth. A search is then made for the voxel with the highest label. This is designated as the start point $p0$. From $p0$, a new distance label map is created by repeating step B and obtaining another voxel with the highest number. This is designated as end point $p1$.

In step C, Initial Path Calculation, starting at $p1$, the distance labels are used to get a path of connected voxel that ends in $p0$. This is done by searching among the neighbors of $p1$ for a voxel with a smaller label, storing the position, then searching among this voxel's neighbors for a voxel with smaller label, and so forth, until $p0$ is reached. See FIG. 1a. It is noted that the foregoing initial path calculation is given by way of example and that other suitable steps for this calculation may be employed instead in an alternative embodiment of the present invention.

In Step D, Path Centering and smoothing, the resulting initial path is generally jagged and is smoothed by, for example, applying the known technique of Gaussian smoothing. Any vertex is replaced by the weighted average of its n neighbors, where n is a constant selected based on the characteristics of the type of smoothing desired, where a larger or smaller value for n will determine the extent of the area over which an average is obtained. The process is repeated over a number of iterations. Any new vertex position is tested for collision with the colon wall or boundary surface by verifying whether the new coordinate still lies within the segmented colon. In the event of a collision, the vertex is left at the last collision-free position. The resulting path may be visualized by way of a helpful analogy from the field of static mechanics where the resulting path for this process resembles the path resulting from pulling apart both ends of a mass-less flexible string that goes through the colon. See FIG. 1b.

This smooth path is centered using spheres with increasing sizes. See FIG. 3. It will be understood that a sphere in the present context is represented by a polyhedral structure with a sufficient number of facets for an acceptably close representation. Such a polyhedron exhibits vertices, not to be confused herein with the path vertices. A small sphere is centered at a vertex along the path.

The vertices on this sphere are checked for collision with the colon wall. If vertices are in collision, a translation force is defined and calculated, based on the sphere normals. This force is used to move the sphere away from the wall. The sphere is constrained to move on a plane perpendicular to the path. If the sphere is no longer in collision, the size of the sphere is increased and the collision calculation and shift are repeated. The process stops when the sphere cannot be shifted and/or increased any further without creating a collision. Thus, the sphere exhibits a maximal size short of colliding with the walls. The center of the sphere is now taken as the new position for the vertex. The process repeats for the next vertex of the trajectory. See FIG. 1c. After the centering, the path undergoes another Gaussian smoothing, with collision control. This time fewer iterations and a smaller neighborhood are used.

A description of a collision detection technique and calculation of translation force is given in a publication by Geiger, B., "Real-Time Collision Detection and Response for Complex Environments," Computer Graphics International 2000; Jun. 19-23, 2000; Geneva, Switzerland. This article, whereof the disclosure is herein incorporated by reference to the extent not incompatible with the present invention, presents a method for collision detection that is well suited to complex environments, such as those obtained from medical imaging and for objects that are in permanent contact. The method is based on a point-intetrahedral-mesh query. Spatial and temporal coherence are used to achieve interactive speed. In addition to collision detection, the system calculates a force and torque that can be used for collision response.

However, the collision detection and force calculation in the present invention is preferably done directly on the voxel, rather than on polyhedral reconstructions, although it generally follows the approach outlined in the aforementioned paper by Geiger.

Figure 2:
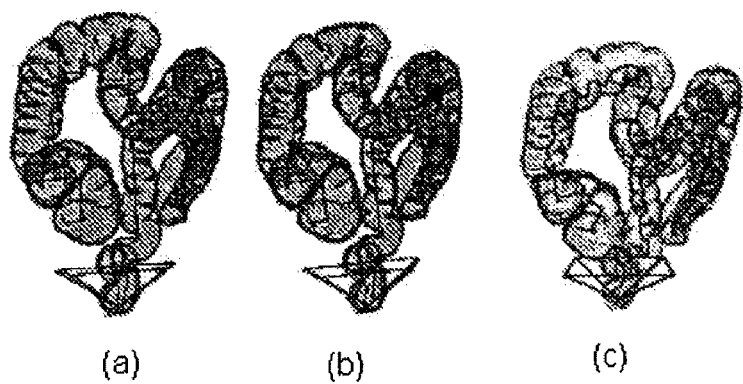
Figure 3:
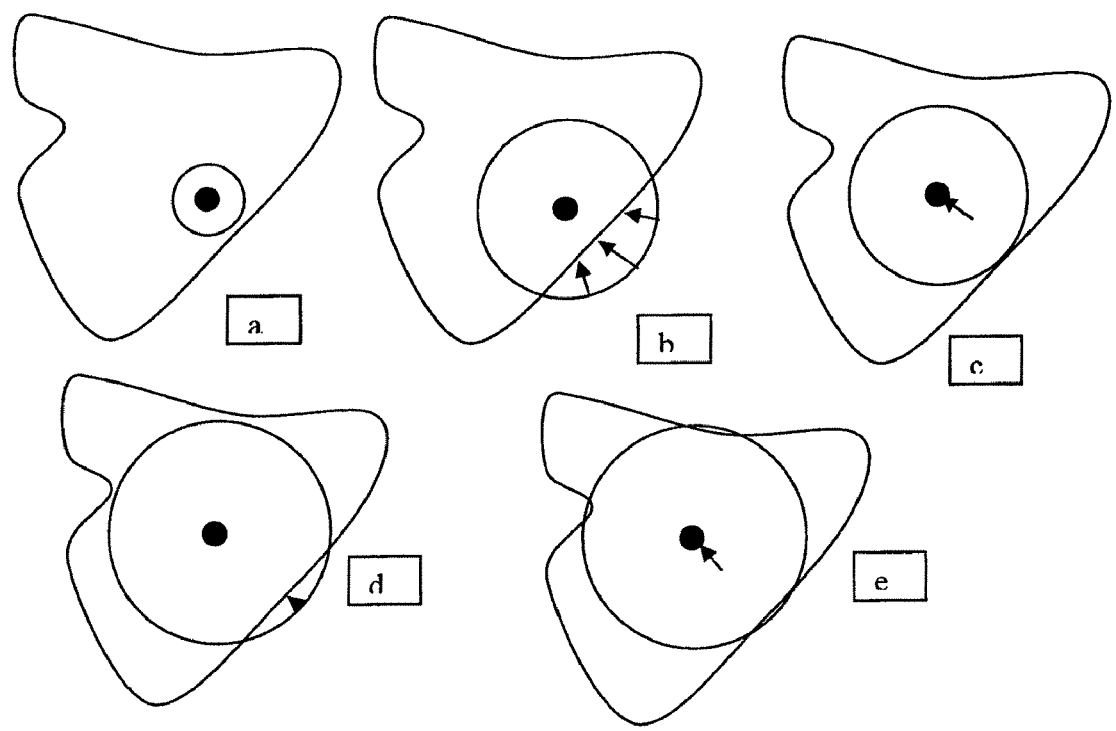
FIG. 3 shows details of centering steps in accordance with an embodiment of the invention.

In summary, FIGS. 1a and 2a show an initial voxel path, FIGS. 1b and 2b show an initial smoothing step, and FIGS. 1c and 2c show final centering. FIG. 3 at a shows a centering step in which a sphere is set at the vertex location. In FIG. 3 at b the sphere size is increased until it collides with the wall. From the collision, a translation force is calculated. In FIG. 3 at c, the translation is applied until the sphere is no longer in collision. The sphere size is increased once more and it now collides with the wall. At d a translation is calculated. After translation has occurred, the sphere reaches a position where it cannot grow any further. This is the final vertex position at e in FIG. 3.

The primary example used is that of a virtual colonoscopy; however, the method of the invention is applicable to other virtual endoscopic examinations and, indeed generally to a cavity having boundary surfaces.

It is particularly emphasized that the method of the invention is applicable to other datasets which are not necessarily prepared for virtual endoscopy, such as, by way of example, blood vessels with contrast, as has been stated above. The centerline method has other possible uses, including registration or mapping two centerlines onto each other, making measurements, defining orthogonal cross sections along a vessel, segmentation, and visualization.

The invention has been described by way of exemplary embodiments. It will be apparent to one of ordinary skill in the art to which it pertains that various changes and substitutions may be made without departing from the spirit of the invention. For example, as will be appreciated, the consecutive numbering of voxels is conveniently made in ascending numerical order and it is apparent that a descending sequence or any other labeling ordinal sequence of labeling can be used. For another example, variations in the method of derivation of the initial path may be made in an equivalent manner. Thus, other suitable ways of deriving the initial path may be substituted for the steps disclosed above by way of example for the steps of Colon Segmentation, Start- and Endpoint calculation, and/or Initial Path calculation. Given a suitable initial path, the step of Path centering and smoothing can then be carried out.

These and similar variations and substitutions are contemplated in the present invention which is defined by the claims following.

What is claimed is:

1. A method for automatic centerline extraction for a virtual endoscopy image of an organ having a boundary wall, comprising:

deriving an endoscopy voxel dataset by using an endoscopy protocol;

starting with an initial voxel in said dataset, labeling voxels neighboring said initial voxel with a first label number of a series of consecutively increasing label numbers;

labeling voxels neighboring respective ones of said voxels having said first label number with a second label number of said series;

repeating the foregoing step by labeling with progressively higher label numbers those voxels neighboring voxels numbered in said foregoing step, until an endpoint is reached with voxels having a highest label number;

starting at a first voxel with said highest label number, searching for a neighboring second voxel with a smaller label number than said first voxel and storing the location thereof;

starting at said second voxel, searching for a neighboring third voxel with a smaller label number than said second voxel and storing the location thereof;

repeating the foregoing step until said initial voxel is reached, thereby establishing an initial path through said image between said initial and said first voxel;

smoothing said initial path to result in an intermediate path, said intermediate path exhibiting plurality of vertices;

centering on a first vertex, a sphere exhibiting a maximal diameter short of contacting said boundary walls;

centering on further vertices, further respective spheres exhibiting respective maximal diameters short of contacting said boundary wall; and forming a centered path by consecutively joining centers of said spheres;

wherein the above steps is performed by a digital computer.

2. A method as recited in claim 1, wherein said step of forming a centered path consecutively joining centers of said spheres comprises:

smoothing said centered path;

centering on a selected first point of said centered path a sphere exhibiting a maximal diameter short of contacting said boundary walls;

centering on selected further points of said centered path, respective spheres exhibiting respective maximal diameters short of contacting said boundary wall; and forming a modified centered path by consecutively joining centers of said spheres.

3. A method as recited in claim 2 wherein said first point and said further points comprise vertices of said centered path.

4. A method as recited in claim 1 wherein said step of forming a centered path consecutively joining centers of said spheres comprises:

smoothing said centered path;

centering on a selected first point of said centered path a sphere exhibiting a maximal diameter short of contacting said boundary walls;

centering on selected further points of said centered path, respective spheres exhibiting respective maximal diameters short of contacting said boundary wall; and forming a modified centered path by consecutively joining centers of said spheres; and selectively repeating the above-listed steps of centering on selected further points and forming a modified center path until said centered path has been yet further modified to a desired degree of smoothing.

5. A method as recited in claim 4 wherein said first point and said further points comprise vertices of said centered path.

6. A method for automatic centerline extraction for a virtual endoscopy image of an organ having a boundary, comprising:

deriving an endoscopy voxel dataset by using an endoscopy protocol;

starting with an initial voxel in said dataset, labeling first neighboring voxels of said initial voxel with a first label number of a progressive series;

labeling next neighboring voxels of said first neighboring voxels a second label number of said series;

repeating the foregoing step until an endpoint is reached with voxels having a final label number of said series;

starting at a first voxel with said final label number, searching for a neighboring second voxel with a prior label number than said first voxel and storing the location thereof;

starting at said second voxel, searching for a neighboring third voxel with a prior label number than said second voxel and storing the location thereof;

repeating the foregoing step until said initial voxel is reached, thereby establishing an initial path through said image between said initial and said first voxel;

smoothing said initial path to result in an intermediate path;

centering on selected points of said intermediate paths, respective spheres exhibiting respective maximal diameters short of contacting said boundary; and forming a centered path by consecutively joining centers of said spheres;

wherein the above steps is performed by a digital computer.

7. A method as recited in claim 6 wherein:

said step of establishing an initial path comprises establishing an initial path exhibiting vertices; and said step of centering on selected points of said intermediate paths, respective spheres comprises centering said respective spheres on said vertices.

8. A method as recited in claim 6 wherein said step of forming a centered path consecutively joining centers of said spheres comprises:

smoothing said centered path;

centering on a selected first point of said centered path a sphere exhibiting a maximal diameter short of contacting said boundaries;

centering on selected further points of said centered path, respective spheres exhibiting respective maximal diameters short of contacting said boundary wall;

forming a modified centered path by consecutively joining centers of said spheres; and selectively repeating the above listed steps of centering on selected further points and forming a modified center path until said centered path has been yet further modified to a desired degree of smoothing.

9. A method as recited in claim 8 wherein:

said step of establishing an initial path comprises establishing an initial path exhibiting vertices; and said step of centering on selected points of said intermediate paths, respective spheres comprises centering said respective spheres on said vertices.

* * * * *